United States Patent

[11] 3,630,109

| [72] | Inventors | Harry T. MacMichael<br>Secane;<br>William A. McNamara, Ridley Park, both of Pa. |
|---|---|---|
| [21] | Appl. No. | 11,648 |
| [22] | Filed | Feb. 16, 1970 |
| [45] | Patented | Dec. 28, 1971 |
| [73] | Assignee | Atlantic Richfield Company<br>Philadelphia, Pa. |

[54] PORTABLE FACING AND GROOVING MACHINE
10 Claims, 6 Drawing Figs.

| [52] | U.S. Cl. | 82/4 C |
|---|---|---|
| [51] | Int. Cl. | B23b 5/16 |
| [50] | Field of Search | 82/4 C |

[56] References Cited
UNITED STATES PATENTS

| 2,518,929 | 8/1950 | Peters | 82/4 C |
|---|---|---|---|
| 3,280,672 | 10/1966 | Riedel | 82/4 C X |
| 3,141,365 | 7/1964 | Peters | 83/4 C |

Primary Examiner—William S. Lawson
Attorney—Robert R. Cochran

ABSTRACT: An annular tool or device for facing or grooving flanges adapted to fixedly mount thereon comprising an inner rotatable housing means with ring gear attached thereto and a tool arm rigidly attached at two points carrying a toolholder means for holding a metal-cutting tool and means for rotating the inner rotatable housing within an annular fixed housing so as to cause the tool to face or groove the flange.

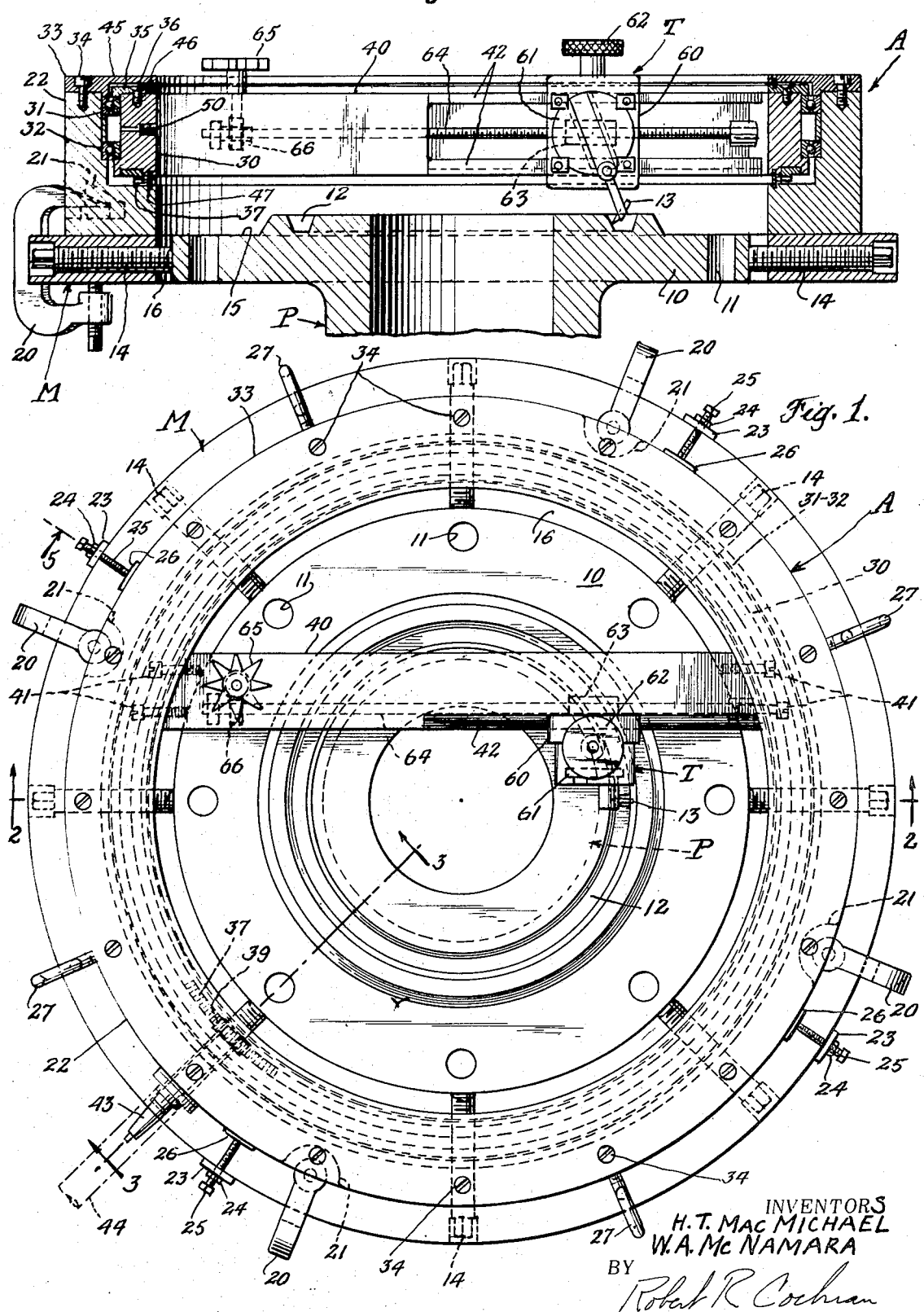

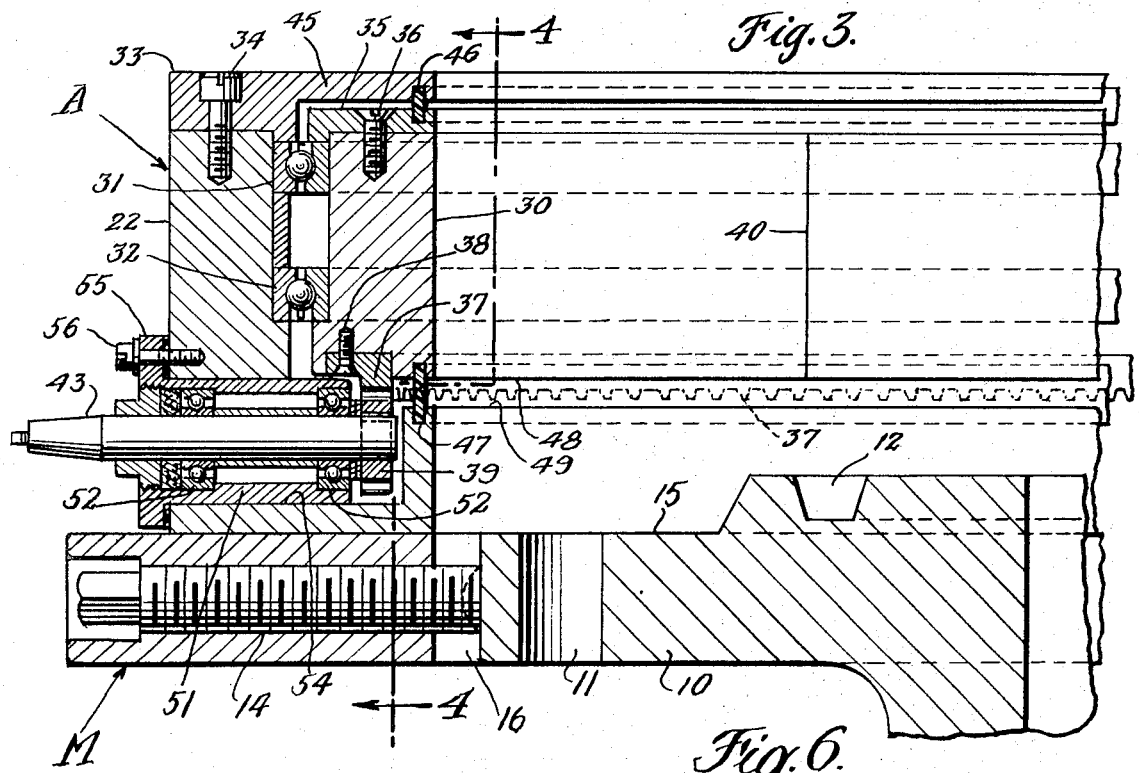
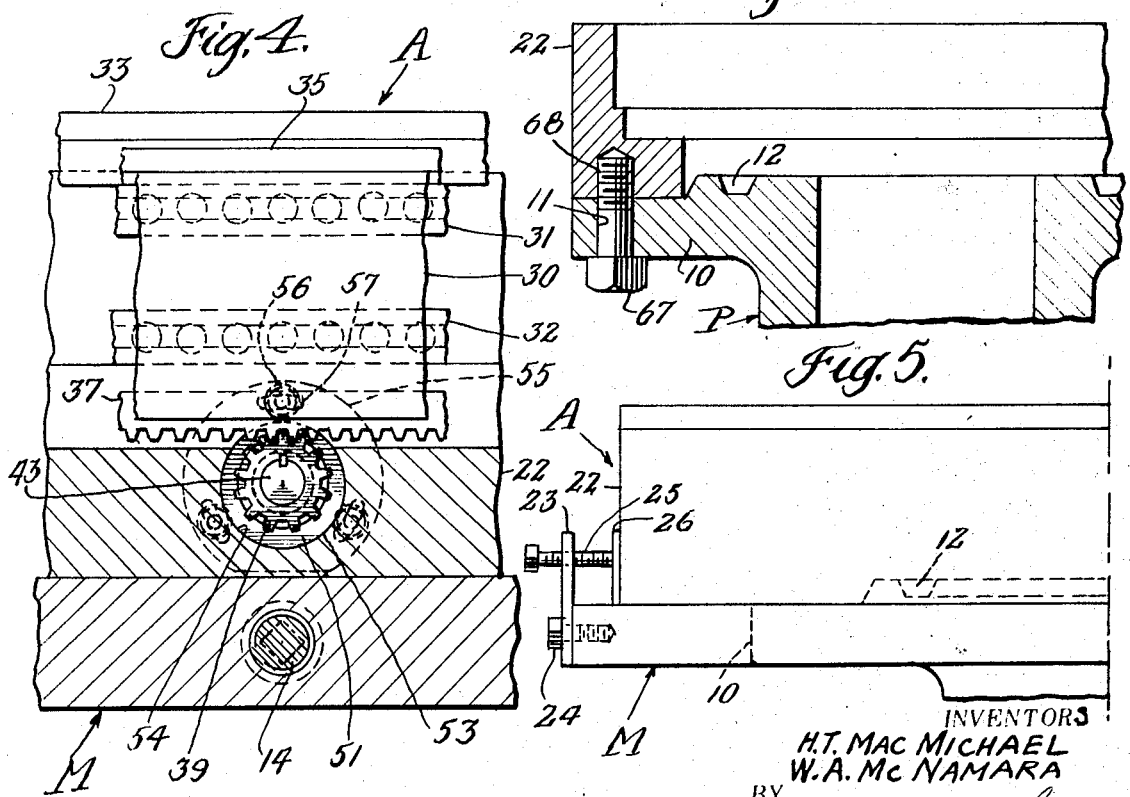

PORTABLE FACING AND GROOVING MACHINE

BACKGROUND OF THE INVENTION

1. Field of the Invention

When flanges of large-diameter pipes need refacing and regrooving to prevent leakage, it is difficult, expensive and inconvenient to remove an entire pipe section and transfer it to the shop for repairs. Thus, a need for a portable facing and grooving machine has arisen.

2. Description of the Prior Art

Known portable facing and grooving machines involve supporting the metal cutting tool on a central revolving axis which could not be made as steady and rigid as the specifications for a smooth true flange facing would require. These devices were cumbersome and bulky and required elaborate supporting structures to steady the center revolving axis. The view of the workpiece was usually obstructed, which was a great disadvantage as to both safety and flexibility of operation.

SUMMARY OF THE INVENTION

The problems of prior art devices are overcome by fitting the tool holder, also called a Tree Tool in the art, on a tool arm which is attached at both ends to a gear driven, rotating, annular inner housing member which rotates in a plane within an outer annular structure fixedly mounted to the flange being faced or grooved. The flange being worked may be seen at all times since the view is not restricted by the frame and head. The improved operation is due to increased rigidity resulting from the design of the device and results in a more accurate, smoother groove and facing job.

An object of this invention is to provide a lightweight, self-contained device for facing or grooving pipe flanges which is of annular ringlike form and is easily mountable in place to a flange.

A further object is to provide a portable facing and grooving machine which is provided with a rotable inner housing or ring carrying a Tree Tool.

Another object is to provide a flange facing and grooving device which allows a better view of the work surface and hence safer operation.

Another object is to provide a device which can make flange facings and groovings which are more smooth and true than achieved by prior art devices.

These and other objects will become apparent from the following description referring to the accompanying drawings.

BRIEF DESCRIPTION OF THE DRAWINGS

FIG. 1 is a plan view of a device constructed in accordance with the invention secured in operating position to the flange of a pipe to be machined.

FIG. 2 is a cross section taken on a line 2—2 of FIG. 1.

FIG. 3 is a cross section taken on a line 3—3 of FIG. 1.

FIG. 4 is a fragmentary sectional view taken as indicated on the irregular line 4—4 of FIG. 3.

FIG. 5 is an elevational view illustrating an axial aligning device employed, the view being taken as indicated by the arrow 5 in FIG. 1.

FIG. 6 is a fragmentary sectional view illustrating a modified form of mounting the device.

DETAILED DESCRIPTION OF THE DRAWINGS AND DESCRIPTION OF THE PREFERRED EMBODIMENTS

Referring to the drawings, P denotes a section of pipe having a flange 10, bolt holes 11 and a ring groove 12; A denotes the annular or ringlike flange facing and grooving device of the present invention; T denotes a Tree Tool carrying a cutting tool 13; and M denotes a mounting or setup ring for the device.

The rugged setup ring M is secured to the outside diameter of the pipe flange 10 by means of a plurality of hardened cup point screws 14, in this instance eight such screws being shown, it being pointed out that when securing the setup ring in place it is accurately leveled with the face 15 of the flange and centralized around the flange with an annular space 16 between the outer diameter of the flange and the inner diameter of the setup ring.

The annular device A is then firmly secured to the setup ring M as by means of heavy-duty C clamps 20 fitting into cut out portions 21 in the outer housing 22 of the device A as seen in FIGS. 1 and 2. When applying the clamps 20, the device A is axially aligned with the axis of the pipe P as by means of aligning plates 23 secured by bolts 24 to the periphery of the set up ring as shown in FIGS. 1 and 5. The plates 23 are provided with set screws 25 which engage plates 26 of soft material positioned between the ends of the screws and the housing 22 to prevent marring of the housing. In large installations, eyebolts 27 are provided at peripherally spaced intervals around the housing 22 for purposes of handling and setting up of the device.

Flange Facing and Grooving Device

The improved flange facing and grooving device A comprises in general the above mentioned fixed outer annular housing 22; an inner rotatable annular housing 30; vertically spaced annular "Kaydon" radial thrust bearings 31 and 32 for rotatably mounting the inner annular housing 30 in spaced relation to the fixed outer housing 22; an annular cover plate 33 secured to the outer housing as by means of screws 34; an annular cover plate 35 secured to the rotatable inner housing 30 as by means of screws 36; an annular ring gear 37 secured to the lower face of the inner housing 30 as by means of the lower face of the inner housing 30 as by means of screws 38 (FIG. 3); a driving pinion 39 meshing with the ring gear 37 for imparting rotation to the inner housing; a crossbar 40 secured to the inner housing by means of screws 41 (FIG. 1) and having dovetail ways 42 for sideably mounting the above-mentioned tool tree T; a drive shaft 43 for the drive pinion 39; and a flexible drive shaft 44 (FIG. 1) for connecting the drive shaft 43 to a suitable remote source of power (not shown), for example, a high-speed air motor mounted on a solid support to prevent transmission of vibrations to the device A.

By referring particularly to FIG. 1 it will be seen that due to the open ringlike form of the device the cutting action of the tool can be advantageously observed.

As best seen in FIG. 3, it will be observed that the cover plate 33 of the outer fixed housing 22 has an inner portion 45 which overlies and is spaced slightly above the cover plate 35 of the inner rotatable housing 30 and that a "Teflon" (trifluoroethylene fluorocarbon resin) sealing ring 46 is provided between the cover plates. A second "Teflon" sealing ring 47 is provided between the lower surface 48 of the inner housing 30 and the adjacent surface 49 of the outer housing 22 (FIG. 3). Thus, the ring bearings 31–32 are well sealed and can be packed with grease. A removable grease plug 50 (FIG. 2) is provided for the introduction of the grease.

Drive

The pinion drive shaft 43 is rotatably mounted in an eccentric housing 51 by means of spaced antifriction bearings 52. The body of the housing is of eccentric form as shown at 53 (FIG. 4) and fits in a bore 54 of the fixed outer housing 22. This eccentric housing is provided with an outer flange 55 for adjustably securing it to the housing 22 by means of bolts 56 fitting slots 57 in the flange 55. Thus simple and effective means is provided for taking up any backlash of the driving pinion 39 and the driver ring gear 37.

Tree Tool

The details of construction of the Tree Tool T need not be considered herein as they form no part of the present invention per se, but the general arrangement thereof is to be noted as follows.

The Tree Tool generally includes a base or body member 60 slideably mounted for back-and-forth movement in the dovetail ways 42 of the cross bar 40 of the inner rotatable housing 30 in known manner. The body member 60 is provided with a swivel head 61 adapted to be set at a devised angle. For example when machining the ring groove 12 the swivel head would be set at the angle shown in FIG. 2 and the cutting tool 13 would be positioned as shown. A suitable knob 62 controls the cutting action of the cutting tool 13.

The body member 60 is provided with a nut 63 travelling on the longitudinal feed screw 64. Turning of the star wheel 65 effects rotation of the feed screw 64 by means of right angle gearing 66 with the result that the tool tree T is caused to travel along the dovetail ways 42.

In the modification illustrated in FIG. 6 a simplified arrangement is shown which may be employed when the device is used only for machining the ring groove 12. In such instances the setup ring M above described is not used and the fixed outer housing 22 is secured directly to the pipe flange 10 by means of bolts 67 in the flange holes 11 which are screwed into threaded holes 68 provided in the bottom face of the housing 22.

It will be seen from the foregoing description that a very compact, rugged and simple flange finishing device is provided whereby the machining of pipe flange faces and ring grooves is facilitated and rendered more accurate than heretofore. The compactness of the device is particularly advantageous for "inplace" machining of pipe flanges where available working space is limited.

It is also noted, by way of example, but not limitation, that the major parts of the device such as the fixed outer housing, the rotatable inner housing, the housing covers are preferably constructed of lightweight high-strength aluminum. Thus, a self-contained unit of extremely light weight and high strength is provided.

Although the invention has been described in considerable detail so as to set forth one specific embodiment, variations and modifications may be made by skilled artisans without departing from the spirit and scope of the invention as set forth in the appended claims.

We claim:

1. A self-contained portable device for facing and ring grooving a workpiece such as a pipe flange comprising an outer fixed annular housing, an inner rotatable annular housing, annular radial-thrust bearing means for the inner rotatable housing mounted in said outer fixed housing, an adjustable tool tree carried within said inner rotatable housing, and drive means for imparting rotation to said inner housing.

2. A device in accordance with claim 1 in which said drive means includes a ring gear carried by said inner rotatable housing and a drive pinion rotatably mounted in said outer fixed housing.

3. A device in accordance with claim 2 and further including an eccentric housing adjustably mounted in said outer fixed housing for rotatably mounting said drive pinion.

4. A device in accordance with claim 1 wherein bearing sealing rings are provided between said inner and outer housings.

5. In a device as defined in claim 1 the combination of a support ring for the device, means for rigidly securing said ring to said pipe flange being processed, and means for positioning said support ring in axial alignment with said pipe flange.

6. A device in accordance with claim 1 wherein said inner rotatable housing is provided with a crossbar on which said tool tree is adjustably mounted.

7. A device in accordance with claim 1 wherein said drive means comprises a pinion attached to a shaft driven by an air motor.

8. A device according to claim 4 wherein said sealing rings are "Teflon."

9. A device according to claim 6 adapted for facing wherein said tool tree is driven by a feed rod a measured distance along said crossbar per rotation of said inner housing.

10. A self-contained portable device for facing and ring grooving flanges of pipes comprising a ringlike outer housing, a set up ring, means for securing said set up ring to the pipe flange in surrounding coaxial relation thereto, means for securing said outer housing to said setup ring, means for positioning said outer housing on said setup ring with its axis aligned with the axis of the pipe and flange being machined, an inner ringlike housing rotatably mounted in said outer housing, a ring gear secured to said inner housing, a drive pinion meshing with said ring gear and rotatably mounted in said outer housing, a cross bar secured to said inner housing, a tool tree mounted on said crossbar for back-and-forth movement along said bar, a cutting tool adjustably mounted on said tool tree, means for imparting said back and forth movement to said tool tree to perform flange facing operations and means for adjusting said cutting tool to perform ring grooving operations, said drive pinion being adapted for power drive when performing said flange facing and said ring grooving operations.

* * * * *